United States Patent Office 2,714,591
Patented Aug. 2, 1955

2,714,591

CELLULOSE SULFATE PREPARATION

Eugene D. Klug and Harold M. Spurlin, Wilmington, Del., assignors to Hercules Powder Company, Wilmington, Del., a corporation of Delaware No Drawing. Application September 8, 1951,
Serial No. 245,766

11 Claims. (Cl. 260—215)

This invention relates to the preparation of cellulose sulfate and more particularly to the preparation of water-soluble cellulose sulfate.

Various methods have been proposed and utilized for the preparation of cellulose sulfate. Generally, the processes heretofore proposed have been found deficient in simplicity and economy, and the products obtained have generally lacked desirable properties.

Now in accordance with this invention cellulose sulfate is prepared by steeping cellulose in a bath of steeping liquor composed of up to 70% by weight of sulfuric acid of at least about 90% and not more than 100% strength and lower fatty acid until said cellulose is uniformly impregnated with said steeping liquor, removing excess steeping liquor to adjust the amount of sulfuric acid distributed on the cellulose to not more than about 10 moles and preferably between about 3 and about 6 moles per anhydroglucose unit, suspending the steeped cellulose in an inert organic liquid in which sulfuric acid is insoluble but in which said lower fatty acid is soluble to form a slurry, and sulfating the cellulose, the process being conducted at a temperature below about 20° C., preferably between about 0° C. and about 5° C.

In an alternate embodiment of the invention the cellulose, following the steps of steeping the cellulose and removal of excess steeping liquor as set forth hereinabove, is extracted with a sufficient volume of an inert organic liquid in which sulfuric acid is insoluble but in which lower fatty acid is soluble to form a slurry and a substantial proportion of the resulting extract is removed to produce an extracted cellulose uniformly impregnated with sulfuric acid. The extracted cellulose is suspended in a fresh supply of the same inert organic liquid used to extract the steeped cellulose in a sufficient volume to again form a slurry, and the cellulose is sulfated, the process being conducted at a temperature below about 20° C., preferably between about 0° C. and about 5° C.

It is presently preferred to employ a chemical cellulose which has been suitably activated for esterification with sulfuric acid by activating the cellulose with water by any suitable means and then replacing the water in the cellulose with a lower fatty acid. This initial activation step in the process customarily is not carried out at the low temperatures required for the remainder of the process.

As illustrative of a preferred embodiment of the invention, fibrous chemical cellulose such as shredded wood pulp is activated with water and the water is displaced from the pulp with anhydrous acetic acid. The activated cellulose is steeped in an excess of a steeping liquor composed of up to about 70% concentrated sulfuric acid of at least about 90% and not more than 100% strength, preferably between about 93% and about 98%, and glacial acetic acid until the cellulose is uniformly impregnated with the steeping liquor, excess steeping liquor is removed, as, for example, by filtering or centrifuging, to adjust the amount of sulfuric acid remaining on the cellulose to between about 3 and about 6 moles per anhydroglucose unit, the resulting steeped cellulose is suspended preferably with agitation in a large volume of an organic liquid in which sulfuric acid is not soluble but in which the acetic acid is soluble, such as, for example, ethylene chloride, to form a slurry, and the cellulose is sulfated to produce a substantially completely water-soluble cellulose sulfate, the process following the initial activation step being conducted at a temperature preferably between about 0° C. and about 5° C.

In this process the cellulosic material retains its original fiber form throughout the reaction, and the resulting cellulose sulfate in substantially the same particulate form as the starting cellulose is readily recovered and purified by draining or centrifuging the reaction medium and washing out any remaining sulfuric acid in the fibrous cellulose sulfate with a solvent for sulfuric acid such as a lower fatty acid or an aliphatic alcohol.

The following examples set forth various ways in which the principle of the invention has been practiced. It is to be understood that the examples are purely illustrative and are not to be construed as a limitation of the invention.

EXAMPLE 1

Five parts by weight of acetylation-type wood pulp containing approximately 5% moisture was boiled in water for one hour after which the water was displaced from the pulp by washing with glacial acetic acid. Excess acetic acid was filtered off, leaving a filter cake weighing 16.8 parts by weight. The filter cake was broken up and steeped in an excess of 40% solution of 95% sulfuric acid in glacial acetic acid for five minutes at 3° C. to impregnate the cellulose uniformly, and the excess steeping liquor was filtered off leaving a filter cake weighing 28.7 parts by weight which contained 9.5 parts by weight sulfuric acid, or 3.3 moles sulfuric acid per anhydroglucose unit. The filter cake was broken up and dispersed with agitation in methylene chloride at 3° C. to form a slurry. The resulting slurry was stirred at 3° C. for 1.75 hours during which time the cellulose sulfated and became substantially completely water soluble. At the end of the 1.75-hour sulfation period the methylene chloride was decanted and the resulting cellulose sulfate having the same particulate form as the starting cellulose, although highly swollen, was stirred with isopropanol chilled to −10° C. The isopropanol was drained off, and the fibrous cellulose sulfate was washed again with cold isopropanol and finally with isopropanol at room temperature until substantially all free sulfuric acid was removed. The cellulose sulfate was then neutralized with sodium acetate and dried in vacuo at 50° C. The product contained 4.5% sulfur which corresponds to a degree of substitution of 0.27 sulfate group per anhydroglucose unit.

EXAMPLE 2

Five parts by weight of acetylation-type wood pulp containing approximately 5% moisture was boiled in water for one hour after which the water was displaced from the pulp by washing with glacial acetic acid. Excess acetic acid was filtered off, leaving a filter cake weighing 16.8 parts by weight. The filter cake was broken up and steeped in an excess of 40% solution of 95% sulfuric acid in glacial acetic acid for five minutes at 3° C. to uniformly impregnate the cellulose, and the excess steeping liquor was filtered off leaving a filter cake weighing 46.5 parts by weight which contained 16.7 parts by weight sulfuric acid, or 5.85 moles sulfuric acid per anhydroglucose unit. The filter cake was broken up and dispersed with agitation in methylene chloride at 3° C. to form a slurry, and the slurry was stirred for 15 minutes at 3° C. A substantial proportion of the acetic acid dissolved in the methylene chloride and was thus extracted, but the sulfuric acid being insoluble in methylene chloride was left uniformly distributed on the cellulose. Then a substantial proportion of the methylene chloride-acetic acid extract was decanted, and was replaced by fresh methylene chloride at 3° C. to again form a slurry. The slurry was stirred at 3° C. for 1.5 hours during which time the cellulose sulfated to a substantially completely water-soluble product. The cellulose sulfate thus formed was recovered, washed and dried substantially as set forth in Example 1. The product contained 6.8% sulfur which corresponds to a degree of substitution of 0.43 sulfate group per anhydroglucose unit.

EXAMPLES 3–6

A series of cellulose sulfates was prepared following substantially the same procedure set forth in Example 2. Pertinent data with respect to times, proportions, reaction diluent, and degree of sulfation for these are summarized in the following table. In each instance the resulting cellulose sulfate obtained was substantially completely water soluble.

*Preparation of cellulose sulfate*

| Example No. | Steeping Time in 40% $H_2SO_4$ in Acetic Acid (Minutes) | Filter Cake Following Steeping | | | Reaction Diluent | Sulfation Reaction | | |
|---|---|---|---|---|---|---|---|---|
| | | Parts by Weight | $H_2SO_4$ (Parts by Weight) | $H_2SO_4$ [1] (Moles) | | Time [2] (Hours) | Percent S in Product | Degree of Substitution [3] |
| 3 | 5 | 32.7 | 11.1 | 3.9 | Methylene chloride | 1.5 | 4.5 | 0.27 |
| 4 | 15 | 40.8 | 14.4 | 5.05 | do | 3.5 | 6.1 | 0.38 |
| 5 | 15 | 36.8 | 12.8 | 4.48 | Ethylene dichloride | 5.25 | 6.1 | 0.38 |
| 6 | 15 | 41.9 | 14.8 | 5.20 | Tetrachloroethylene | 3.5 | 5.4 | 0.33 |

All runs were based on 5 parts by weight of cellulose containing approximately 5% moisture. The temperature following activation was maintained at approximately 3° C.
[1] Moles $H_2SO_4$ per anhydroglucose unit.
[2] From time filter cake was stirred into the reaction diluent.
[3] Sulfate group per anhydroglucose unit.

The cellulose in accordance with this invention can be any of the usual types of chemical cellulose such as wood pulp or cotton linters in the form of sheets or bulk, shredded, granulated, finely cut, cellulose floc, and the like.

It is presently preferred to activate the cellulose for esterification with sulfuric acid, since suitable activation greatly reduces the reaction time necessary to obtain the desired degree of sulfation, and permits better control of the reaction. Activation can be accomplished by numerous means. By way of example, the cellulose may be steeped or boiled in water, or it may be subjected to freezing in water, or digested in water under pressure at elevated temperatures above the boiling point of water. Alternatively, the cellulose may be first steeped in a dilute aqueous caustic alkali solution or in aqueous caustic alkali of mercerizing strength followed by removal of the alkali with water. In any activation with water it is necessary to displace the water in the cellulose with a lower fatty acid, such as acetic, propionic, butyric, isobutyric, valeric, isovaleric, methyl ethyl acetic acid, trimethyl acetic acid, and the like. Cellulose can also be suitably activated by treatment directly with glacial acetic acid. A preferred activation treatment involves boiling a chemical cellulose such as acetylation grade wood pulp in water for about an hour followed by displacement of the water with glacial acetic acid. Displacement of water with lower fatty acid should be carried to the point where any small amount of water remaining in the cellulose will not reduce the strength of the sulfuric acid introduced on the cellulose in the subsequent steeping operation below about 90%.

The cellulose in accordance with this invention is subjected to a steeping step in a bath of steeping liquor to impregnate the cellulose uniformly with a solution of sulfuric acid in a lower fatty acid such as acetic acid, propionic acid, butyric acid, isobutyric acid, valeric acid, isovaleric acid, methyl ethyl acetic acid, trimethyl acetic acid, and the like. When an activated cellulose wet with a lower fatty acid is employed, preferably this same fatty acid should be employed as the sulfuric acid solvent in preparing the steeping liquor. Glacial acetic acid is presently preferred as the sulfuric acid solvent. Under the reaction conditions employed, that is, at temperatures below about 20° C., the lower fatty acids are substantially inert chemically toward sulfuric acid.

The steeping liquor will contain up to about 70% by weight of sulfuric acid of at least 90% and not more than 100% strength dissolved in lower fatty acid. Steeping liquors containing appreciably more than 70% sulfuric acid have a pronounced dissolving action on the cellulose. Preferably, the steeping liquor will contain between about 20% and about 50% sulfuric acid dissolved in lower fatty acid. Although sulfuric acid in lower percentages than 20% is operable, such dilute solutions are not very practical because of the excessive volume required. The minimum quantity of steeping liquor employed will be an amount containing at least about 10 moles of sulfuric acid per anhydroglucose unit in the cellulose. Ordinarily a quantity in excess of the minimum requirement will be employed sufficient to form an easily stirred fluid slurry with the cellulose and to insure uniform and complete impregnation of the cellulose with the sulfuric acid solution. Preferably between about 10 parts and about 50 parts of steeping liquor per part of cellulose will be employed, and the excess will be removed to adjust the amount of sulfuric acid distributed on the cellulose to not more than about 10 moles and preferably between about 3 and about 6 moles per anhydroglucose unit.

It is important to keep the water content in the steeping liquor below about 10% by weight based on the sulfuric acid content, preferably between about 2% and about 7% by weight. More water has the effect of markedly slowing down the rate of the subsequent sulfation reaction. On the other hand, a strictly anhydrous steeping liquor is much more costly and the subsequent sulfation reaction does not appear to proceed as smoothly or uniformly as when a steeping liquor containing from about 2% to about 7% of water based on the sulfuric acid content is employed. A convenient method for insuring optimum proportions of water in the steeping liquor is to dissolve 93–98% sulfuric acid in an anhydrous lower fatty acid such as glacial acetic acid.

Steeping time will ordinarily be limited to the time required to obtain uniform impregnation of the cellulose by the steeping liquor, and this is accomplished within a few minutes, usually within 15 minutes or less.

Steeping is conducted at a temperature below about 20° C., and preferably between about 0° and about 5° C. At these low temperatures the steeping liquor in accordance with this invention exerts almost no sulfating action on the cellulose while uniformly distributing small amounts of concentrated sulfuric acid on the cellulose.

Following the steeping operation, excess steeping liquor is removed to adjust the amount of sulfuric acid distributed on the cellulose to not more than about 10 moles and preferably between about 3 and about 6 moles per anhydroglucose unit. There is a disadvantage in employing large amounts of sulfuric acid, above about 10 moles per anhydroglucose unit, in that cellulose sulfate purification and sulfuric acid recovery problems become more difficult. For optimum control and economy for the preparation of water-soluble cellulose sulfates, the sulfuric acid is preferably limited to between about 3 and about 6 moles per anhydroglucose unit. With less than about 3 moles of sulfuric acid per anhydroglucose unit, cellulose sulfates soluble in aqueous alkali solutions, but incompletely soluble in water are obtained. For all practical purposes, less than about 0.5 mole of sulfuric acid per anhydroglucose unit will seldom be employed in preparing these low-substituted products soluble in aqueous alkali solutions, but incompletely soluble in water.

Control of the sulfuric acid to cellulose ratio is an important feature of this invention. By regulating the composition of the steeping liquor and by regulating the amount of steeping liquor which is removed, it is possible to control accurately the ratio of sulfuric acid to cellulose, as desired.

The excess steeping liquor can be removed readily by gravity drainage, by filtration, by centrifugation, and similar equivalent means, since the cellulose remains in its original fibrous state throughout the process. Filtration is ordinarily employed, and it is desirable to regulate the composition of the steeping liquor so that the resulting filter cake will be relatively easy to disintegrate. Temperatures are maintained below about 20° C., and preferably between about 0° C. and about 5° C.

It is of interest from the standpoint of economy to note that the excess steeping liquor can be re-used after simple adjustment of the composition to contain the desired amounts of concentrated sulfuric acid and lower fatty acid.

Following removal of excess steeping liquor and adjustment of the quantity of sulfuric acid distributed on the cellulose, the steeped cellulose is suspended in an inert organic liquid in which sulfuric acid is insoluble but in which the lower fatty acid employed in the steeping liquor is soluble to form a slurry. This inert organic liquid serves three purposes. In the first place, it serves to extract the sulfuric acid solvent without removing the sulfuric acid and without disturbing the distribution of the sulfuric acid on the cellulose. As soon as the sulfuric acid solvent migrates to the inert liquid, the activity of the sulfuric acid increases and sulfation occurs at a desirable rate which can be easily controlled. In the second place, the inert organic liquid serves as an inert reaction medium for the reaction. A third purpose in using an inert diluent is to provide a good medium for heat transfer. This is important where it is necessary to control the reaction temperature.

Any inert organic liquid in which sulfuric acid is insoluble but in which the lower fatty acids are soluble, and which does not react chemically with any of the reaction components, or have any solvent action on the resulting cellulose sulfate is suitable. Suitable inert organic liquids will include, by way of example, liquid aliphatic hydrocarbons, such as petroleum ether, hexane, heptane, octane, gasoline hydrocarbons, and various other petroleum hydrocarbons; liquid aromatic hydrocarbons, such as benzene, toluene, xylene; liquid cycloaliphatic hydrocarbons, such as cyclopentane, cyclohexane, and the like; and liquid chlorinated derivatives of these groups of hydrocarbons. It is presently preferred to employ chlorinated aliphatic hydrocarbons such as methylene chloride, ethylene dichloride, tetrachloroethylene, and the like.

This inert organic liquid serving as the inert reaction medium will be employed in a quantity sufficient to form an easily stirred or agitated slurry with the steeped cellulose. Ordinarily, between about 10 and about 50 parts for each part of cellulose will be employed.

As stated hereinbefore, the lower fatty acid migrates to the inert organic liquid, thus increasing the activity of the sulfuric acid, and sulfation proceeds at a desirable rate which is easily controlled. It is preferable to agitate the slurry continually following suspension of the steeped cellulose in the inert organic reaction medium in order to insure uniform reaction. Sulfation is carried out until the resulting cellulose sulfate attains the desired solubility characteristics, the temperature being maintained below about 20° C., and preferably between about 0° C. and about 5° C. The course of the sulfation reaction is readily followed by taking small samples from time to time and testing them for solubility. For example, when the objective is the preparation of a water-soluble cellulose sulfate, small samples taken from time to time are tested for water solubility. Ordinarily, substantially complete water solubility will be attained in somewhat less than a 6-hour sulfation period, often within a period of 1½ to 2 hours when an activated cellulose is employed.

As soon as desired solubility is attained, the reaction liquor is drained or decanted from the solid, particulate cellulose sulfate which is then washed free of any remaining sulfuric acid. Washing is carried out with a sulfuric acid solvent in which the cellulose sulfate is insoluble, such as a lower fatty acid or a lower aliphatic alcohol, until the product is free of sulfuric acid. The choice of a suitable washing medium is purely a matter of convenience, although generally it will be found practical to employ the same sulfuric acid solvent that was employed in the steeping liquor. For example, when anhydrous acetic acid is used as the sulfuric acid solvent in the steeping liquor, anhydrous acetic acid will ordinarily also be used as the washing medium. However, the examples illustrate that another sulfuric acid solvent, namely, isopropanol, is equally as effective.

After the cellulose sulfate product is substantially free of sulfuric acid, and preferably while still wet with fatty acid or alcohol washing liquor, the sulfate groups on the cellulose are neutralized with a solution of sodium acetate in acetic acid. Before drying, the product can be freed of acetic acid by washing with diethyl ether, methanol or any other comparatively low-boiling organic solvent. Other neutralizing agents such as sodium hydroxide, sodium carbonate, sodium bicarbonate, and the like may be employed, if desired, preferably as concentrated aqueous solutions. Drying may be carried out at temperatures as high or higher than 70° C. However, it is preferred to dry in vacuo at slightly elevated temperatures, up to about 50° C.

In an alternative embodiment of the invention the cellulose, following the steps of steeping the cellulose and removal of excess steeping liquor to adjust the sulfuric acid distributed on the cellulose, is subjected to an extraction step with a sufficient volume of an inert organic liquid in which sulfuric acid is insoluble but in which the lower fatty acid is soluble to form a slurry. The purpose of this extraction step is to remove a substantial proportion of the lower fatty acid solvent before proceeding with the sulfation reaction.

Ordinarily, it is preferred to employ the same inert organic liquid for this extraction operation as is employed subsequently as the inert reaction medium, as hereinbefore set forth. For example, when methylene chloride is to be used as the inert reaction medium, methylene chloride will ordinarily be used as the extraction medium in this extraction step.

The steeped cellulose containing the desired amount of sulfuric acid is preferably suspended with agitation in the extraction medium and then allowed to settle and separate into an extract phase and a fibrous cellulose phase. A substantial proportion of the resulting extract is then decanted, drained, or otherwise drawn off, leaving an extracted cellulose uniformly impregnated with the desired amount of sulfuric acid, since the sulfuric acid is not extracted by this operation, nor is its distribution on the cellulose disturbed. In general, between about 10 and about 50 parts of the extraction medium per part of cellulose will be employed.

Following the extraction step, the extracted cellulose is then suspended, preferably with agitation, in a fresh supply of the same organic liquid used to extract the cellulose, and the cellulose is sulfated, as set forth previously in this specification.

It is important in all parts of the process following activation of the cellulose to maintain the temperature below about 20° C., and preferably between about 0° C. and about 5° C. Above about 20° C. the sulfation reaction proceeds so rapidly that it cannot be satisfactorily controlled, and the products obtained are undesirably degraded. Below about 0° C. the sulfation reaction is too slow to be practical. Within the temperature range set forth the sulfation reaction proceeds at a satisfactory rate which is readily controlled, and undesirable degradation effects are at a minimum.

The process in accordance with this invention provides an economical and practical process for preparing cellulose sulfates. The process has the distinct advantage that even small amounts of sulfuric acid are uniformly distributed on the cellulose. Moreover, the amount of sulfuric acid to be employed is accurately controlled, and recovery and purification problems are greatly simplified. Cellulose sulfates prepared in accordance with this invention are useful as detergent aids, in drilling muds, as thickeners in various comestible products and in cosmetics; for textile printing and sizing; for greaseproofing paper; and as a water-soluble thickening and sizing agent generally.

What we claim and desire to protect by Letters Patent is:

1. A process for preparing cellulose sulfate which comprises steeping cellulose in a bath of steeping liquor comprising essentially between about 20% and 70% by weight of sulfuric acid of at least about 90% and not more than 100% strength dissolved in lower fatty acid until said cellulose is uniformly impregnated with said steeping liquor, removing excess steeping liquor to adjust the amount of sulfuric acid distributed on the cellulose to not more than about 10 moles per anhydroglucose unit, suspending the steeped cellulose, following removal of excess steeping liquor, in an inert organic liquid selected from the group consisting of liquid hydrocarbons and liquid chlorinated hydrocarbons to form a slurry, and sulfating the cellulose, the entire process being conducted at a temperature below about 20° C.

2. The process in accordance with claim 1 wherein the entire process is conducted at a temperature between about 0° C. and about 5° C.

3. A process for preparing a water-soluble cellulose sulfate which comprises steeping cellulose in a bath of steeping liquor comprising essentially between about 20% and 70% by weight of sulfuric acid of at least about 90% and not more than 100% strength dissolved in lower fatty acid until said cellulose is uniformly impregnated with said steeping liquor, removing excess steeping liquor to adjust the amount of sulfuric acid distributed on the cellulose to between about 3 and about 6 moles per anhydroglucose unit, suspending the steeped cellulose, following removal of excess steeping liquor, in an inert organic liquid selected from the group consisting of liquid hydrocarbons and liquid chlorinated hydrocarbons to form a slurry, and sulfating the cellulose to produce a substantially complete water-soluble cellulosic sulfate, the entire process being conducted at a temperature below about 20° C.

4. The process in accordance with claim 3 wherein the entire process is conducted at a temperature between about 0° C. and about 5° C.

5. A process for preparing a water-soluble cellulose sulfate which comprises steeping activated cellulose in a bath of steeping liquor comprising essentially between about 20% and 70% by weight of sulfuric acid of at least about 90% and not more than 100% strength dissolved in lower fatty acid until said cellulose is uniformly impregnated with said steeping liquor, removing excess steeping liquor to adjust the amount of sulfuric acid distributed on the cellulose to between about 3 and about 6 moles per anhydroglucose unit, suspending the steeped cellulose, following removal of excess steeping liquid, in an inert organic liquid selected from the group consisting of liquid hydrocarbons and liquid chlorinated hydrocarbons to form a slurry, and sulfating the cellulose to produce a substantially completely water-soluble cellulose sulfate, the entire process being conducted at a temperature below about 20° C.

6. A process for preparing a water-soluble cellulose sulfate which comprises activating cellulose with water and then replacing the water in said cellulose with lower fatty acid, steeping the activated cellulose in a bath of steeping liquor comprising essentially between about 20% and 70% by weight of sulfuric acid of at least about 90% and not more than 100% strength dissolved in lower fatty acid until said cellulose is uniformly impregnated with said steeping liquor, removing excess steeping liquor to adjust the amount of sulfuric acid distributed on the cellulose to between about 3 and about 6 moles per anhydroglucose unit, suspending the steeped cellulose, following removal of excess steeping liquor, in an inert liquid chlorinated hydrocarbon to form a slurry, and sulfating the cellulose to produce a substantially completely water-soluble cellulose sulfate, the entire process following the initial activation step being conducted at a temperature below about 20° C.

7. The process in accordance with claim 6 wherein the entire process following the initial activation step is conducted at a temperature between about 0° C. and about 5° C.

8. A process for preparing a water-soluble cellulose sulfate which comprises activating cellulose with water and then replacing the water in said cellulose with lower fatty acid, steeping the activated cellulose in a bath of steeping liquor comprising essentially between about 20% and 70% by weight of sulfuric acid of at least about 90% and not more than 100% strength dissolved in lower fatty acid until said cellulose is uniformly impregnated with said steeping liquor, removing excess steeping liquor to adjust the amount of sulfuric acid distributed on the cellulose to between about 3 and about 6 moles per anhydroglucose unit, extracting the steeped cellulose, following removal of excess steeping liquor, with a sufficient volume of an inert liquid chlorinated hydrocarbon to form a slurry, removing a substantial proportion of the resulting extract to produce an extracted cellulose uniformly impregnated with sulfuric acid, suspending the extracted cellulose in a fresh supply of the same inert liquid chlorinated hydrocarbon used to extract said steeped cellulose in a sufficient volume to again form a slurry, and sulfating the cellulose to produce a substantially completely water-soluble cellulose sufate, the entire process following the initial activation step being conducted at a temperature below about 20° C.

9. The process in accordance with claim 8 wherein the entire process following the initial activation step is conducted at a temperature between about 0° C. and about 5° C.

10. A process for preparing a water-soluble cellulose sulfate which comprises activating cellulose with water and then replacing the water in said cellulose with anhydrous acetic acid, steeping the activated cellulose in a bath of steeping liquor comprising essentially between about 20% and 70% by weight of concentrated sulfuric acid of between about 93% and 98% strength dissolved in anhydrous acetic acid until said cellulose is uniformly impregnated with said steeping liquir, removing excess steeping liquor to adjust the amount of sulfuric acid distributed on the cellulose to between about 3 and about 6 moles per anhydroglucose unit, suspending the steeped cellulose, following removal of excess steeping liquor, in a sufficient quantity of methylene chloride to form a slurry, and sulfating the cellulose to produce a substantially completely water-soluble cellulose sulfate, the entire process following the initial activation step being conducted at a temperature between about 0° C. and about 5° C.

11. A process for preparing a water-soluble cellulose sulfate which comprises activating cellulose with water and then replacing the water in said cellulose with anhydrous acetic acid, steeping the activated cellulose in a bath of steeping liquor comprising essentially between about 20% and 70% by weight of concentrated sulfuric acid of between about 93% and 98% strength dissolved in anhydrous acetic acid until said cellulose is uniformly impregnated with said steeping liquor, removing excess steeping liquor to adjust the amount of sulfuric acid distributed on the cellulose to between about 3 and about 6 moles per anhydroglucose unit, extracting the steeped cellulose, following removal of excess steeping liquor, with a sufficient volume of methylene chloride to form a slurry, removing a substantial proportion of the resulting extract to produce an extracted cellulose uniformly impregnated with sulfuric acid, suspending the extracted cellulose in a sufficient volume of fresh methylene chloride to again form a slurry, and sulfating the cellulose to produce a substantially completely water-soluble cellulose sulfate, the entire process following the initial activation step being conducted at a temperature between about 0° C. and about 5° C.

References Cited in the file of this patent

UNITED STATES PATENTS

| | | |
|---|---|---|
| 2,345,333 | Fink et al. | Mar. 28, 1944 |
| 2,539,451 | Malm et al. | Jan. 30, 1951 |
| 2,559,914 | Frank | July 10, 1951 |
| 2,622,079 | Crane | Dec. 16, 1952 |

FOREIGN PATENTS

| | | |
|---|---|---|
| 303,493 | Great Britain | 1930 |
| 377,795 | Great Britain | 1932 |

OTHER REFERENCES

Ott: "Cellulose and Cellulose Derivatives," 1943, pp. 676, 677, 680 to 682.